United States Patent [19]

Matsumoto

[11] Patent Number: 5,779,952
[45] Date of Patent: Jul. 14, 1998

[54] METHOD OF FABRICATING A MOLDED PART OF THERMOPLASTIC RESIN

[75] Inventor: Koichi Matsumoto, Yokkaichi, Japan

[73] Assignee: Sumitomo Wiring Systems, Ltd., Japan

[21] Appl. No.: 741,387

[22] Filed: Oct. 29, 1996

Related U.S. Application Data

[63] Continuation of Ser. No. 296,649, Aug. 26, 1994, abandoned.

[30] Foreign Application Priority Data

Sep. 10, 1993 [JP] Japan ............... 5-249906

[51] Int. Cl.⁶ ............................................ B29C 44/02
[52] U.S. Cl. ...................... 264/51; 264/68; 264/328.12
[58] Field of Search ........................ 264/328.12, 51, 264/68

[56] References Cited

U.S. PATENT DOCUMENTS

| | | | |
|---|---|---|---|
| 4,154,784 | 5/1979 | Ruhl | 264/45.5 |
| 4,157,413 | 6/1979 | Ruhl | 408/159 |
| 4,213,645 | 7/1980 | Ruhl | 293/145 |
| 4,396,147 | 8/1983 | Jackson | 229/44 |
| 4,868,926 | 9/1989 | Lowson | 2/22 |
| 4,891,471 | 1/1990 | Ono et al. | |
| 4,965,030 | 10/1990 | Thom | 264/328.12 |
| 5,294,385 | 3/1994 | Hirota | 264/328.12 |

FOREIGN PATENT DOCUMENTS

| | | | |
|---|---|---|---|
| 2377269 | 11/1978 | France . | |
| 1950406 | 4/1970 | Germany . | |
| 2420840 | 11/1975 | Germany . | |
| 2945882 | 5/1981 | Germany . | |
| 62-183319 | 8/1987 | Japan | 264/328.12 |

OTHER PUBLICATIONS

Excerpt Translation (1 page) of DE 29 45 882 A1 (Undated).

*Primary Examiner*—Allan R. Kuhns
*Attorney, Agent, or Firm*—Jordan B. Bierman; Bierman, Muserlian and Lucas

[57] ABSTRACT

There is disclosed a molded part made of thermoplastic resin to which a foaming agent is added and including a protector body (51) having lock portions (56) serving as a strength required area, a lid element (52), and a hinge (54) between the protector body (51) and the lid element (52) and having a wall thickness less than that of the protector body (51) and the lid element (52), wherein the thermoplastic resin forming the protector body (51) including the lock portions (56) contains no foams but the thermoplastic resin forming the lid element (52) contains foams on opposite side of the hinge (54) from the protector body (51), thereby accomplishing a reduced weight and an ensured strength of the strength required area.

1 Claim, 7 Drawing Sheets

R ← → F

METHOD OF FABRICATING A MOLDED PART OF THERMOPLASTIC RESIN

This application is a continuation, of application Ser. No. 08/296,649, filed Aug. 26, 1994, now abandoned.

BACKGROUND OF THE INVENTION

1. Field of the Invention

The present invention relates to a molded part made of foamed thermoplastic resin employed as a protector or the like for an automotive wiring harness and a method of fabricating the same.

2. Description of the Prior Art

Wiring harnesses used for wiring in an automotive electric system are generally protected by protectors so as not to be damaged by a flash formed by punching in a press molded vehicular body. Such protectors include a protector 100 shown in FIG. 7. The protector 100 comprises a body portion 101 of a U-shaped cross-sectional configuration, and an opening and closing lid 102 for closing an open surface of the body portion 101. The body portion 101 and the lid 102 are coupled to each other with a hinge 103 which is thinner than the body portion 101 and lid 102. The protector 100 as above constructed is fabricated by injection molding using thermoplastic resin such as polypropylene.

There has been a need for weight reduction of automotive vehicles for various reasons, and the protector 100 is no exception. One of the approaches to reduce the weight of a molded part of thermoplastic resin such as a protector is to foam the molded part. Such a foamed molded part is formed by adding a foaming agent to thermoplastic resin to plasticize the thermoplastic resin, and injecting the plasticized thermoplastic resin into a mold. In the past, plasticating conditions in the fabricating steps of the foamed molded part have been merely to contain foams in the resin throughout the molded part.

The protector 100 shown in FIG. 7 further comprises lock portions 104 for closing the opening after the wiring harness is housed in the protector 100 and a bolting portion 105 for fixing the protector 100 on the vehicular body. The lock portions 104 and the bolting portion 105 are required to have a strength higher than that of other areas and, hence, it is not preferred to form the lock portions 104 and the bolting portion 105 from the resin containing foams. That is, the fabrication of the protector 100 by the foam molding technique well-known in the art results in an insufficient strength of the lock portions 104 and bolting portion 105.

SUMMARY OF THE INVENTION

The present invention is intended for a molded part made of thermoplastic resin to which a foaming agent is added. According to the present invention, the molded part comprises: a first thick-walled portion including a strength required area, a second thick-walled portion which does not include the strength required area, and a hinge portion formed between the first and second thick-walled portions and having a wall thickness less than that of the first and second thick-walled portions, the second thick-walled portion being made of thermoplastic resin containing foams.

According to the molded part of thermoplastic resin of the present invention, the thermoplastic resin including the strength required area contains no foams at least on one of the opposite sides of the hinge portion, thereby providing a relatively high strength of the strength required area. The thermoplastic resin on the other side of the hinge portion contains foams, thereby achieving weight reduction of the molded part of thermoplastic resin.

The present invention is also intended for a method of fabricating a molded part of thermoplastic resin in which plasticized thermoplastic resin is injected into a cavity within a mold from an injection gate of an injection molding machine to form the molded part of thermoplastic resin, the molded part including a first thick-walled portion including a strength required area, a second thick-walled portion which does not include the strength required area, and a hinge portion formed between the first and second thick-walled portions and having a wall thickness less than that of the first and second thick-walled portions. According to the present invention, the method comprises the steps of: feeding thermoplastic resin and a foaming agent into a cylinder of the injection molding machine having a nozzle communicating with the injection gate; rotating a screw disposed in the cylinder at a preset rotational speed to knead and plasticize the thermoplastic resin and the foaming agent in the cylinder; injecting the plasticized thermoplastic resin into the cavity within the mold from the injection gate coupled to an arbitrary portion of the cavity which corresponds to the first thick-walled portion; and cooling the thermoplastic resin in the cavity and then removing the molded part of thermoplastic resin from the mold, the rotational speed of the screw being controlled, in the plasticizing step, so that the thermoplastic resin injected into the cavity is unfoamed at least in a region of the first thick-walled portion which includes the strength required area and is foamed in the second thick-walled portion in accordance with the volume of the first thick-walled portion and the amount of heat generated when the thermoplastic resin passes through the hinge portion.

In the method of the present invention, the screw is rotated at the preset rotational speed when the thermoplastic resin is plasticized to foam the thermoplastic resin injected into the cavity from the injection gate and passing through the hinge portion. The rotational speed is set so that the thermoplastic resin is not foamed in a portion corresponding to the strength required area prior to passage thereof through the hinge portion. The molded part of thermoplastic resin containing no foams at least in the strength required area is formed from the thermoplastic resin containing the foaming agent.

According to another aspect of the present invention, the method comprises the steps of: feeding thermoplastic resin and a foaming agent into a cylinder of the injection molding machine having a nozzle communicating with the injection gate; rotating a screw disposed in the cylinder, with a preset back pressure applied to the screw, to knead and plasticize the thermoplastic resin and the foaming agent in the cylinder; injecting the plasticized thermoplastic resin into the cavity within the mold from the injection gate coupled to an arbitrary portion of the cavity which corresponds to the first thick-walled portion; and cooling the thermoplastic resin in the cavity and then removing the molded part of thermoplastic resin from the mold, the back pressure applied to the screw being controlled, in the plasticizing step, so that the thermoplastic resin injected into the cavity is unfoamed at least in a region of the first thick-walled portion which includes the strength required area and is foamed in the second thick-walled portion in accordance with the volume of the first thick-walled portion and the amount of heat generated when the thermoplastic resin passes through the hinge portion.

In the method of the second aspect of the present invention, the screw is rotated, with the preset back pressure applied thereto, when the thermoplastic resin is plasticized to foam the thermoplastic resin injected into the cavity from the injection gate and passing through the hinge portion. The back pressure is set so that the thermoplastic resin is not foamed in a portion corresponding to the strength required area prior to passage thereof through the hinge portion. The molded part of thermoplastic resin containing no foams at least in the strength required area is formed from the thermoplastic resin containing the foaming agent.

According to the method of the two aspects of the present invention, the molded part is fabricated in which the thermoplastic resin forming the strength required area contains no foams on one of the opposite sides of the hinge and the thermoplastic resin contains foams on the other side of the hinge.

An object of the present invention is to provide a molded part of thermoplastic resin having a reduced weight as a whole and an increased strength of a required portion, and a method of fabricating the same.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
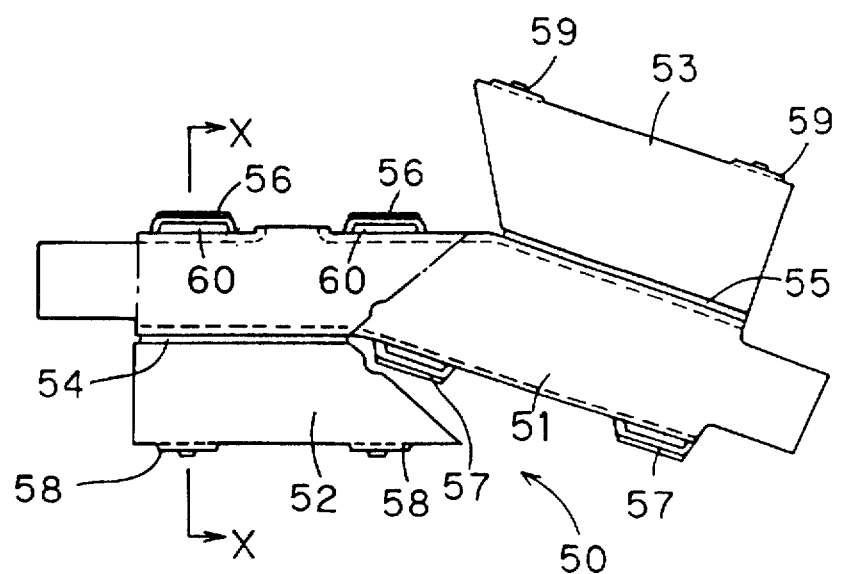
FIG. 1 is a plan view of a protector according to the present invention.
Figure 2:
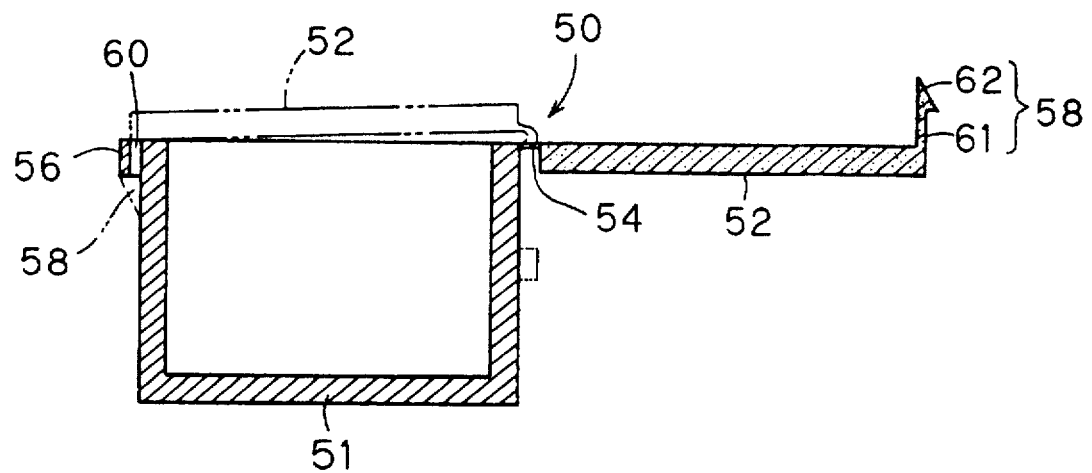
FIG. 2 is an enlarged sectional view taken along the line X—X of FIG. 1.

FIGS. 1 and 2 illustrate a molded part of thermoplastic resin in the form of a protector 50 for an automotive wiring harness according to the present invention.

The protector 50 comprises a protector body 51 of a U-shaped cross-sectional configuration, and plate-like lid elements 52, 53 for closing an open surface of the protector body 51. The protector body 51 is coupled to the lid elements 52, 53 with hinges 54, 55. Lock portions 56, 57 are formed integrally with the protector body 51 at upper ends of the respective side surfaces of the protector body 51, and lock portions 58, 59 are formed integrally with the lid elements 52, 53 on respective one side of the lid elements 52, 53. The lid element 52 is fixed in such a manner as to close a part of the open surface of the protector body 51 by engagement of the lock portions 56 with the lock portions 58 (FIG. 2), and the lid element 53 is fixed in such a manner as to close the other part of the open surface of the protector body 51 by engagement of the lock portions 57 with the lock portions 59. The protector 50 is adapted such that the protector body 51 including the lock portions 56, 57 is made of thermoplastic resin containing no foams, and the lid elements 52, 53 are made of thermoplastic resin containing foams which are dispersed generally uniformly so as to provide a predetermined expansion ratio.

It will be apparent from FIG. 2 that the hinges 54, 55 of the protector 50 are formed in such a manner that a boundary portion between the protector body 51 and the lid elements 52, 53 are made thinner than the protector body 51 and the lid elements 52, 53. In the above-mentioned automotive protector 50, for example, the thickness of the protector body 51 is 1.5 mm, the thickness of the lid elements 52, 53 is 2.0 mm, and the thickness of the hinges 54, 55 is 0.5 mm.

The lock portions 56, 58 will be discussed below. The lock portions 57, 59 are similar in configuration to the lock portions 56, 58, and the description thereof will be omitted herein.

Each of the lock portions 56 of the protector body 51 defines a through aperture 60 of a rectangular cross-sectional configuration extending vertically therethrough between the lock portion 56 and a side surface of the protector body 51. The through apertures 60 may be deformed by elastic deformation of the lock portions 56. Each of the lock portions 58 includes a projecting piece 61 projecting in a direction orthogonal to the surface of the lid element 52 and having a thickness generally equal to the width of the through apertures 60, and an engaging projection 62 bulging outwardly from the outer surface of the projecting piece 61.

When the lock portions 58 are inserted into the through apertures 60 of the lock portions 56, the engaging projections 62 pass through the through apertures 60 while deforming the through apertures 60. The lock portions 56 are elastically recovered after the engaging projections 62 pass through the through apertures 60. Consequently, the engaging projections 62 are locked by the lock portions 56 and are not capable of being withdrawn from the through apertures 60. In this state, the lid element 52 closes a part of the open surface of the protector body 51.

In the protector 50 as above constructed, the lock portions 56, 57 have a relatively high strength since no foams are present in the thermoplastic resin forming the protector body 51 including the lock portions 56, 57. The lock portions 56, 57 are not easily damaged by a relatively large load applied thereto because of the engagement with the engaging projections 61 of the lock portions 58, 59 of the lid elements 52, 53.

The whole lid elements 52, 53 of the protector 50 are formed of the thermoplastic resin containing foams at the predetermined expansion ratio. The presence of the foams allows the protector 50 to be lighter in weight than a protector of the same volume made of thermoplastic resin containing no foams. As described above, the protector 50 achieves a reduced weight and an increased strength of the relatively greatly loaded lock portions 56, 57.

Figure 3:
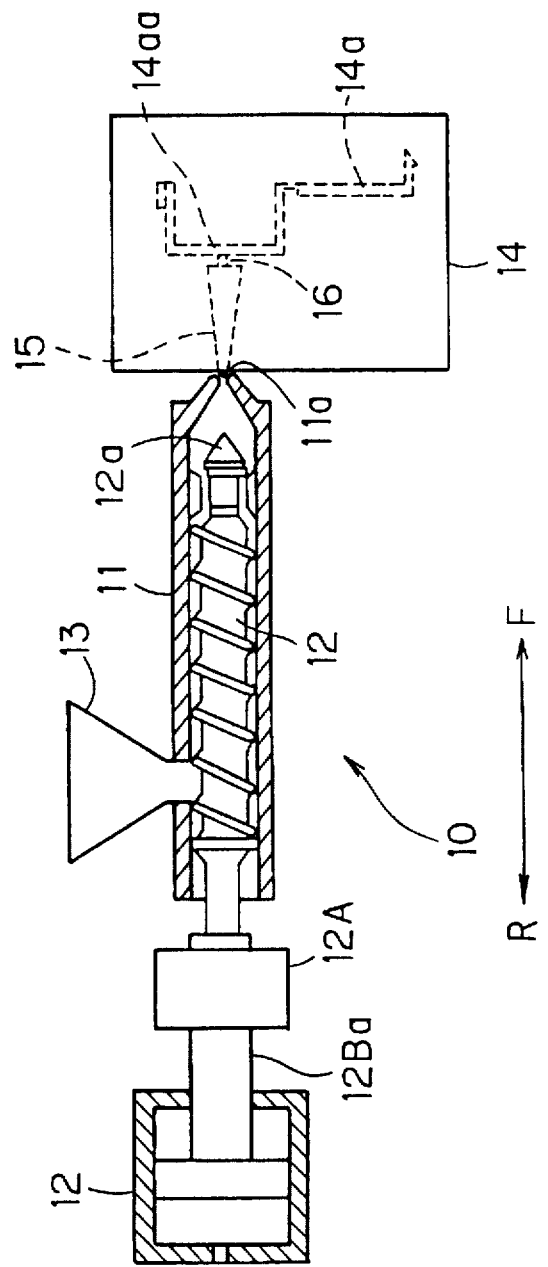
FIG. 3 is a schematic sectional view of an injection molding machine.

The above-mentioned protector 50 is fabricated in a manner to be described below by using an injection molding machine 10 shown in FIG. 3.

The injection molding machine 10 shown in FIG. 3 will now be described. The injection molding machine 10 comprises a cylinder 11, a screw 12, a hopper 13, a mold 14, a sprue 15, and an injection gate 16.

The cylinder 11 has a nozzle 11a at its front end.

The screw 12 is housed in the cylinder 11, with a screw head 12a thereof directed toward the nozzle 11a of the cylinder 11. The screw 12 is rotated by the drive power of a driving source 12A such as a motor. The driving source 12A rotates the screw 12 at a speed indicated by a controller not shown. The driving source 12A is movable in an axial direction of the screw 12 and is fixed to a piston rod 12Ba of an actuator 12B such as a hydraulic cylinder. The actuator 12B applies thrust to the screw 12 to move the screw 12 toward the nozzle 11a of the cylinder 11 (in the direction of the arrow F) and, when the screw 12 moves toward the driving source 12A (in the direction of the arrow R), the actuator 12B applies back pressure against the movement. The actuator 12B can adjust the thrust and back pressure to any magnitude by the indication of the controller not shown.

The hopper 13 has a discharge opening connected to the rear end of the cylinder 11.

The mold 14 includes a plurality of divided molds. The divided molds (not shown) are fastened together to define a cavity 14a of a predetermined configuration, i.e. the same configuration as the protector 50 herein, in the interior of the mold 14.

The sprue 15 is a tapered passage for coupling the nozzle 11a of the cylinder 11 to the injection gate 16 and has a seat for the nozzle 11a at a small-diameter end thereof.

The injection gate 16 is provided between a large-diameter end of the sprue 15 and a position 14aa of the cavity 14a which corresponds to an arbitrary portion of the protector body 51.

Using the injection molding machine 10 as above constructed, the protector 50 shown in FIG. 1 is fabricated through the following procedure.

Figure 5A:
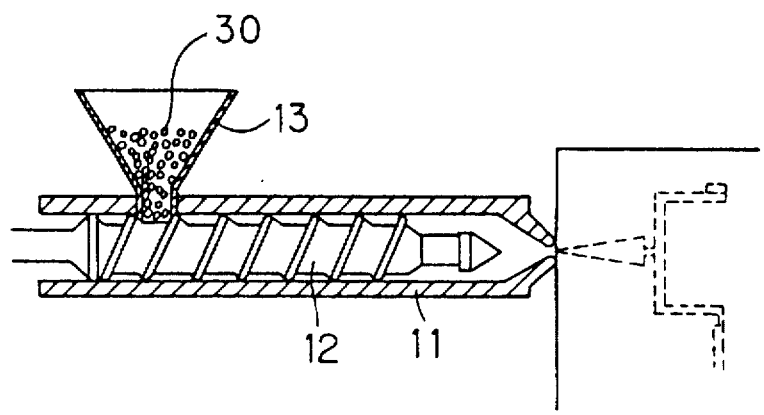
FIGS. 5A to 5C illustrate processes of injection molding.

Referring to FIG. 5A, a thermoplastic resin material 30 and a foaming agent (not shown) are fed into the hopper 13, with the screw 12 advancing to the forefront position (in the direction of the arrow F). The quantity ratio of the thermoplastic resin material to the foaming agent is appropriately determined so as to ensure a required strength of a foamed portion or a foam containing portion in the molded part of thermoplastic resin to be fabricated by this method.

Figure 5B:
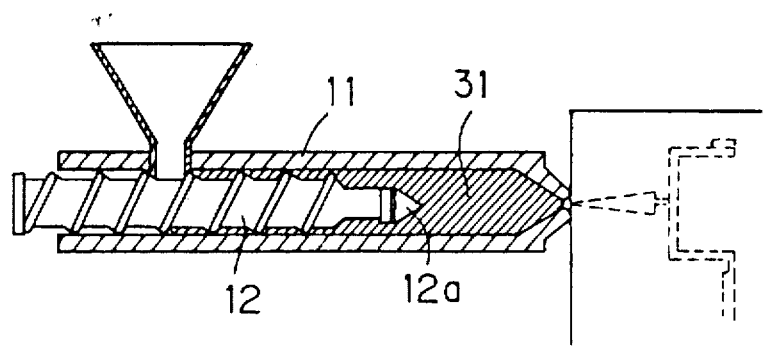

The driving source 12A is actuated, with the thermoplastic resin material 30 and the foaming agent fed in the hopper 13, to rotate the screw 12 in the direction to retract the helical channel of the screw 12 at a rotational speed controlled in a manner to be described later. At that time, a predetermined back pressure equal to or greater than zero which is controlled in a manner to be described later is applied to the screw 12. The rotation of the screw 12 under such conditions permits the thermoplastic resin material 30 and foaming agent in the hopper 13 to be fed into the cylinder 11. The thermoplastic resin material 30 and the foaming agent fed in the cylinder 11 are kneaded by the rotating screw 12 and plasticized into a molten resin 31. The molten resin 31 is transferred to the front of the screw head 12a along the helical channel of the screw 12 as shown in FIG. 5B. The screw 12 is retracted toward the actuator 12B (in the direction of the arrow R) by the pressure of the molten resin 31 extruded into the front of the screw head 12a. The rotation of the screw 12 is interrupted when the screw 12 retracts a predetermined amount. That is, the operation of the driving source 12A is interrupted when a predetermined amount of molten resin 31 is accumulated in the front of the screw head 12a.

Figure 5C:
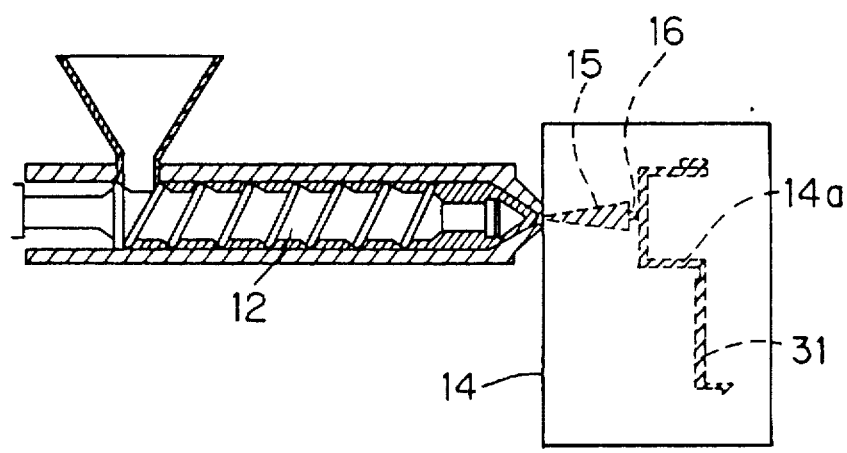

The actuator 12B is actuated, with the rotation of the screw 12 interrupted, to move the screw 12 forwardly (in the direction of the arrow F) at a predetermined speed. This permits the plasticized thermoplastic resin or the molten resin 31 accumulated in the front of the screw head 12a to be fed into the sprue 15 and the injection gate 16 and then injected into the cavity 14a of the mold 14, as shown in FIG. 5C. The predetermined amount of molten resin accumulated in the front of the screw head 12a is entirely injected into the cavity 14a, which is then filled with the plasticized thermoplastic resin 31.

The thermoplastic resin in the cavity 14a is cooled by cooling the mold 14. The mold 14 is then opened, and the molded part of thermoplastic resin or the protector 50 is provided which is of the predetermined configuration.

The method of fabricating a molded part of thermoplastic resin of this preferred embodiment is intended to fabricate the protector 50 in which the protector body 51 is made of the thermoplastic resin containing no foams and the lid elements 52, 53 are made of the thermoplastic resin containing foams generally uniformly at the predetermined expansion ratio. For this purpose, the present method controls the rotational speed of the screw 12 and/or the back pressure against the screw 12 in the following manner in the step of plasticizing the thermoplastic resin. The control method will be described below.

Figure 6:
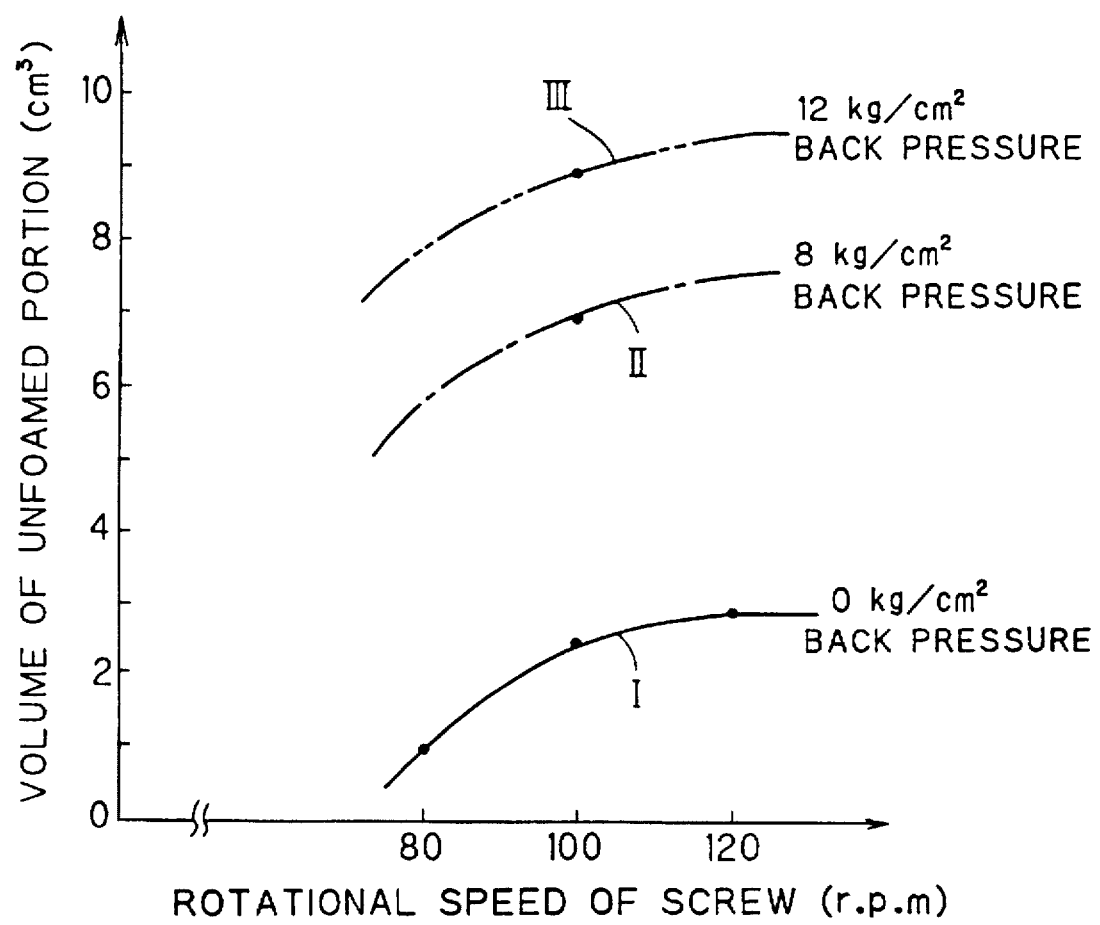
FIG. 6 is a graph showing relation between the rotational speed of a screw and the volume of an unfoamed portion.
Figure 7:
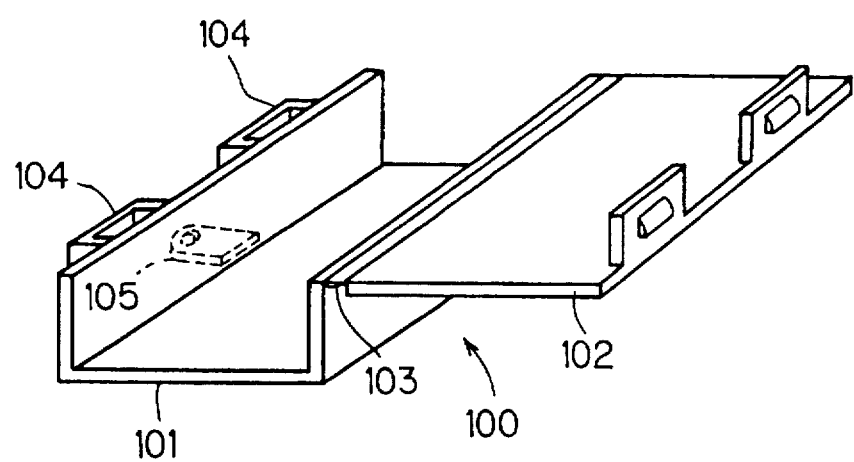
FIG. 7 is a perspective view of a protector for a vehicular harness.

The solid curve I of FIG. 6 shows experimental values of the volume of the unfoamed portion formed in a portion of the molded part of thermoplastic resin which corresponds to an outlet of the injection gate 16 versus the rotational speed of the screw 12 where the back pressure is zero. The curve I indicates that the volume of the unfoamed portion formed in the portion corresponding to the outlet of the injection gate 16 where the back pressure is zero is about 1 $cm^3$ at 80 r.p.m. rotational speed of the screw 12, about 2.5 $cm^3$ at 100 r.p.m., and about 3 $cm^3$ at 120 r.p.m. This indicates that, if the volume of the entire protector body 51 is less than 3 $cm^3$, the 120 r.p.m. rotational speed of the screw 12 ensures that the entire protector body 51, i.e. the lock portions 56, 57, are rendered unfoamed at the back pressure of zero.

As above described, the protector body 51 of a predetermined volume (about 3 $cm^3$ herein) or less which includes the lock portions 56, 57 can be unfoamed by controlling the rotational speed of the screw 12 within an allowable range of the rotational speed in the step of plasticizing the thermoplastic resin. The method of this preferred embodiment wherein the back pressure is fixed to zero is not adapted for the fabrication of the protector 50 including the protector body 51 of not less than 3 $cm^3$ in volume. However, the protector 50 including the protector body 51 of greater volume can be fabricated by controlling the back pressure.

The dashed-and-dotted curve II and dashed-and-double-dotted curve III of FIG. 6 show experimental values of the volume of the unfoamed portion formed in the portion of the molded part of thermoplastic resin which corresponds to the outlet of the injection gate 16 versus the rotational speed of the screw 12 where the back pressure is 8 $Kg/cm^2$ and where the back pressure is 12 $Kg/cm^2$, respectively. It is apparent from FIG. 6 that, if the rotational speed of the screw 12 is 100 r.p.m., the volume of the unfoamed portion is about 3 $cm^3$ at the back pressure of zero, about 7 $cm^3$ at 8 $Kg/cm^2$ back pressure, and about 9 $cm^3$ at 12 $Kg/cm^2$ back pressure. This indicates that the execution of the foregoing plasticizing step under the plasticating conditions wherein the rotational speed of the screw 12 is 96 r.p.m. and the back pressure against the screw 12 is 12 $Kg/cm^2$ allows the fabrication of the protector 50 of FIG. 1 including the protector body 51 of about 9 $cm^3$ in volume without foams contained in the thermoplastic resin forming the whole protector body 51. In this manner, the protector 50 including the protector body 51 of greater volume is fabricated by increasing the back pressure at the constant rotational speed of the screw 12.

Figure 4:
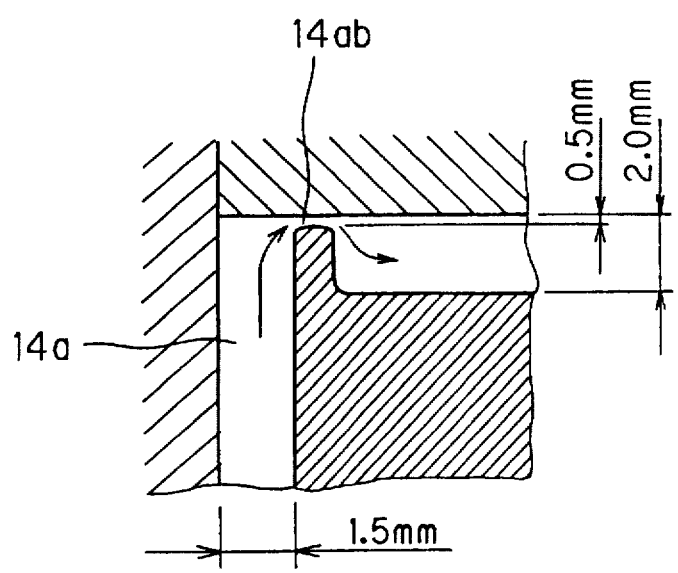
FIG. 4 is an enlarged sectional view of a part of a cavity which corresponds to a hinge portion.

In this method, the following is considered at the same time to control the rotational speed and back pressure. When the plasticized resin is injected from the position 14aa (FIG. 3) into the cavity 14a, the thermoplastic resin flows from a portion corresponding to the protector body 51 through portions corresponding to the hinges 54, 55 into portions corresponding to the lid elements 52, 53 as shown by the arrows of FIG. 4. In fabrication of the protector 50 including the protector body 51 of less than 9 cm³ in volume, the use of the cavity 14a, for example, including the protector body 51 of 1.5 mm in thickness, the lid elements 52, 53 of 2.0 mm in thickness, and the hinges 54, 55 of 0.5 mm in thickness (FIG. 4) allows the thermoplastic resin passing through a portion 14ab corresponding to the hinges 54, 55 to be foamed by shear heat generation due to passage thereof through the narrow portion under plasticating conditions wherein the rotational speed of the screw 12 is 100 r.p.m. and the back pressure against the screw 12 is 12 Kg/cm². Thus, the thermoplastic resin forming the lid elements 52, 53 contains foams entirely uniformly.

In this method, consideration is given to the configuration of the cavity 14a, and the rotational speed and the back pressure are controlled so that the thermoplastic resin passing through the portion 14ab is foamed by shear heat generation.

For the protector body 51 of less than 7 cm³ in volume, the resin forming the protector body 51 contains no foams if the plasticizing step is carried out under the plasticating conditions wherein the rotational speed of the screw 12 is 100 r.p.m. and the back pressure against the screw 12 is 8 Kg/cm². When the plasticizing step is executed under the foregoing plasticating conditions, the resin injected into the cavity 14a of FIG. 4 for the protector 50 is foamed in the portions corresponding to the hinges 54, 55 by shear heat generation due to passage thereof through the portions.

Consequently, the protector 50 is fabricated wherein the protector body 51 is formed of the resin containing no foams and the lid elements 52, 53 are formed of the resin containing foams uniformly.

It will be appreciated from FIG. 6 that this method is adapted so that no foams are present in the resin forming the protector body but foams are generated in the resin passed through the hinge corresponding portions of the cavity by adjusting at least one of the rotational speed and back pressure of the screw 12 when the thermoplastic resin is plasticized. In this case, one of the rotational speed and back pressure of the screw 12 may be fixed in the plasticizing step, only the other being adjusted, so that no foams are present in the resin forming the protector body 51 but foams are generated in the resin passed through the hinge corresponding portion 14ab of the cavity. For fabrication of various types of protectors having different volumes, both of the rotational speed and the back pressure are preferably controlled so that no foams are present in the resin forming the protector body but foams are generated in the resin passed through the hinge corresponding portion of the cavity.

The molded part of thermoplastic resin including a hinge, such as the protector 50, can be fabricated by the above stated method so that the thermoplastic resin including a strength required area such as the lock portions 56, 57 contains no foams and the thermoplastic resin which does not include the strength required area when separated at least by the hinge contains foams. Therefore, the present method accomplishes both the ensured strength of the strength required area and weight reduction of the whole molded part.

Generation of foams in the resin by passage of the resin through the hinge corresponding portion of the cavity depends on a gap width of the hinge corresponding portion 14ab or the thickness of the hinges 54, 55 of the protector 50 of FIGS. 1 and 2. In the preferred embodiment wherein the hinges 54, 55 were 0.5 mm thick, the foamed portion and the unfoamed portion were clearly separated by the hinge corresponding portion 14ab. Table 1 shows the separation and non-separation between the foamed and unfoamed portions by the hinge corresponding portion 14ab where the thickness of the hinge is 0.4 mm, 0.6 mm, 0.8 mm, 1.0 mm. In Table 1, the open circle indicates clear separation between the foamed and unfoamed portions by the hinge corresponding portion 14ab, and the cross indicates non-separation.

TABLE 1

| rotational speed | back pressure | hinge thickness (mm) | | | |
|---|---|---|---|---|---|
| (r.p.m.) | (kg/cm²) | 0.4 | 0.6 | 0.8 | 1.0 |
| 100 | 8 | ○ | ○ | x | x |
|  | 12 | ○ | ○ | x | x |
|  | 16 | x | x | x | x |
| 120 | 8 | ○ | ○ | x | x |
|  | 12 | ○ | ○ | x | x |
|  | 16 | x | x | x | x |
| 140 | 8 | ○ | ○ | x | x |
|  | 12 | ○ | x | x | x |
|  | 16 | x | x | x | x |

It is apparent from Table 1 that, when the hinge thickness was not less than 0.8 mm, the foamed portion and the unfoamed portion were not separated by the hinge corresponding portion 14ab independently of the molding conditions wherein the rotational speed of the screw was 100 to 140 r.p.m. and the back pressure against the screw was 8 to 16 Kg/cm² according to this experiment. Thus the hinge thickness is preferably less than 0.8 mm if the protector 50 is fabricated at least under the foregoing molding conditions. The method of the present invention, however, does not exclude the fabrication of molded parts of thermoplastic resin having the hinge thickness of not less than 0.8 mm by setting molding conditions out of the range of the foregoing molding conditions.

Further, according to the experiment, the foamed portion and the unfoamed portion were not separated by the hinge corresponding portion 14ab independently of the rotational speed of the screw when the back pressure against the screw was not less than 16 Kg/cm² and the hinge thickness was at least not less than 0.4 mm. The separation between the foamed and unfoamed portions is enabled when the hinge thickness is less than 0.4 mm and the back pressure is not less than 16 Kg/cm². It is not preferred that the hinge thickness of the protector 50 is too thin because of the likelihood of decrease in hinge strength. The present invention, however, does not exclude molded parts of thermoplastic resin having the hinge thickness of less than 0.4 mm. Hence, the magnitude of the back pressure is not limited to a specific value in the method of the present invention.

The rotational speed of the screw on the abscissa axis of FIG. 6 and the volume of the unfoamed portion on the ordinate axis thereof are inherent in the injection molding machine of the preferred embodiment, and the present invention is not necessarily limited to these values.

While the invention has been shown and described in detail, the foregoing description is in all aspects illustrative and not restrictive. It is therefore understood that numerous modifications and variations can be devised without departing from the scope of the invention.

What is claimed is:

1. A method of fabricating a molded part in which plasticized thermoplastic resin is injected into a cavity within a mold from an injection gate of an injection molding machine to form said molded part, said method comprising introducing of a mixture of said resin and a foaming agent into a chamber, said foaming agent adapted to generate foam under foaming conditions which are above a minimum temperature and below a maximum pressure, feeding said mixture from said chamber into a first cavity in said mold for forming a first thick-walled portion, feeding said mixture from said first cavity into a hinge cavity for forming a hinge portion, and feeding said mixture from said hinge cavity into a second cavity, thereby filling said mold, said hinge cavity having a thickness less than that of said first cavity and of said second cavity, said foaming agent being outside said foaming conditions while within said chamber, said first cavity, and said hinge cavity, said agent being within said foaming conditions when in said second cavity, whereby foaming takes place in said second cavity, said mixture being above said maximum pressure and below said minimum temperature in said chamber, below said maximum pressure and below said minimum temperature in said first cavity and upon entry into said hinge cavity, whereby feeding said mixture through said hinge cavity into said second cavity increases a temperature of said mixture above said minimum temperature so that foaming takes place in said second cavity.

* * * * *